May 5, 1942.  J. M. SHIMER  2,282,254
SECURING MEANS FOR PUMP LINERS
Filed July 8, 1941
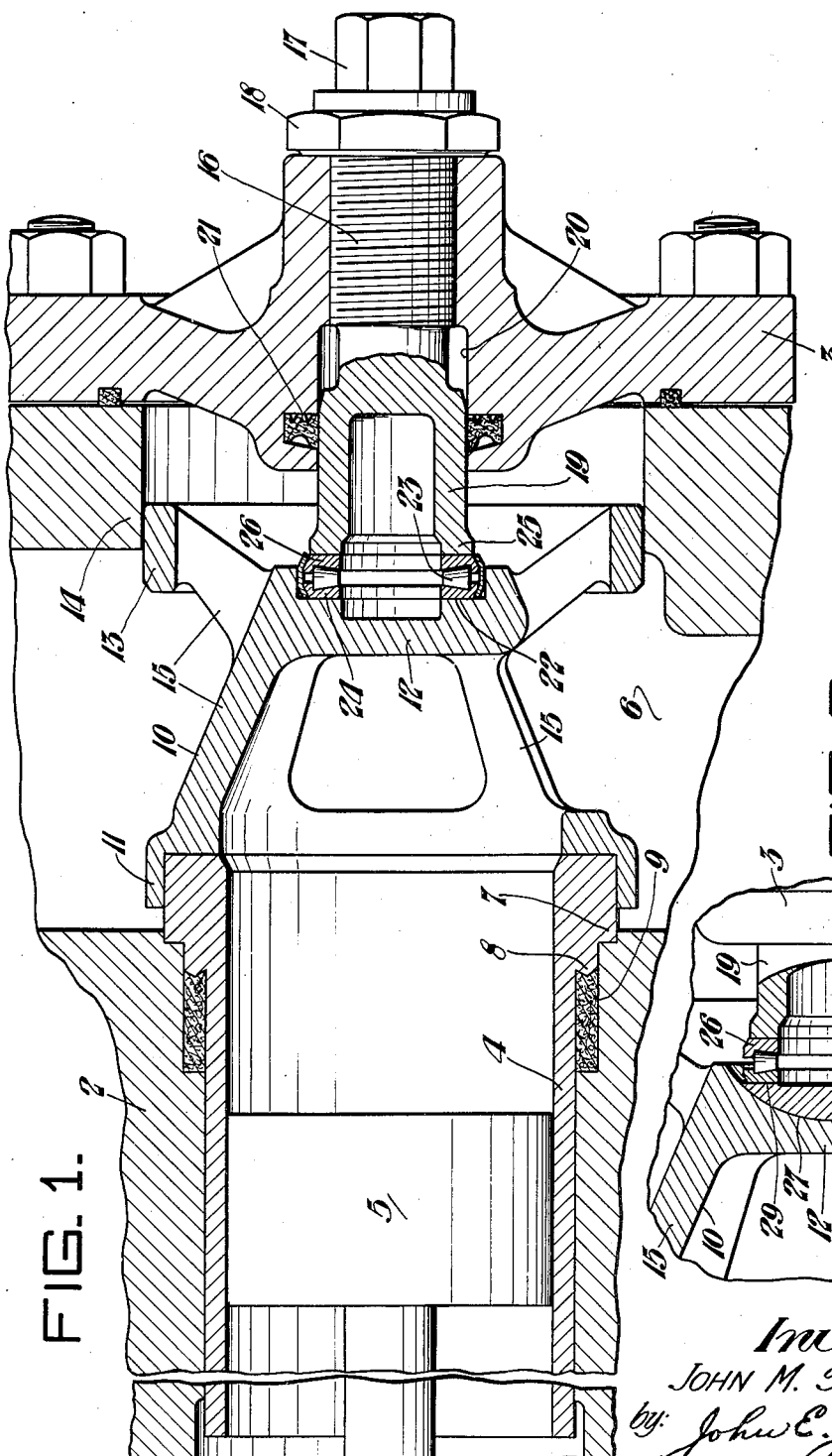
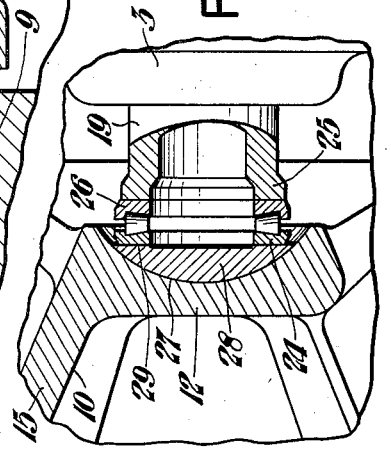
Inventor:
John M. Shimer,
by John E. Jackson
his Attorney.

Patented May 5, 1942

2,282,254

UNITED STATES PATENT OFFICE 2,282,254

SECURING MEANS FOR PUMP LINERS

John M. Shimer, Dallas, Tex., assignor to Oil Well Supply Company, a corporation of New Jersey Application July 8, 1941, Serial No. 401,545

4 Claims. (Cl. 103—216)

This invention relates to improvements in means for securing pump liners in the fluid cylinders of reciprocating pumps and the like.

Present day pump liners have been greatly improved by the use of metals presenting exceptionally hard working surfaces to the wear of the piston, which surfaces are honed to close tolerances. Hence, it is highly important to secure and maintain such liners in accurate alignment without distortion, since any distortion will quickly destroy the benefits obtained by the improved liner construction. Since pump liners are secured in place by endwise or longitudinal pressure, it is essential that the pressure be equally distributed to prevent distortion of the cylindrical wall of the liner.

It is a principal object of my invention to provide means for securing pump liners in place in such a manner as to insure an equal distribution of the holding pressure thereon.

Further objects are to provide means of the character stated which may be readily manipulated and adjusted externally of the pump, to provide for adequate sealing against the loss of fluid; and to provide a simple, economical and efficient mechanism for the purposes set forth.

Additional objects and advantages will become apparent from the following description taken in connection with the accompanying drawing, wherein:

Fig. 1 is a longitudinal sectional view through a pump cylinder showing my invention applied thereto; and Fig. 2 is a fragmentary view of a portion of Fig. 1, showing a modification of the invention.

Referring to the drawing, 2 designates the cylinder or fluid end of a reciprocating pump, having a removable head 3. A cylindrical liner 4 is telescoped in the cylinder bore for receiving the piston 5, said liner being spaced from the cylinder head 3 by an intervening fluid chamber 6.

The inner end of the liner 4 is free and the outer end is provided with an annular flange or shoulder 7 seating in a complemental annular recess provided in the cylinder 2, said liner also having an annular projection 8 inwardly beyond the flange 7 coacting with annular recess 9 in the cylinder wall and packing therein to provide a packing gland for externally sealing the liner against the escape of fluid.

For the purpose of properly seating and retaining the liner 4 in the cylinder, a spacer 10 is provided in the form of an open spider having an inner rim 11 telescopically engaging over the flange 7 of the liner, a central hub 12, and an outer annular guide rim 13 having a close guiding fit with the outer cylindrical portion 14 of the wall of the chamber 6. Said rims and hub of the spacer are concentrically formed as an integral spacer member, being interconnected by suitable webs 15 apertured for free passage of fluid therethrough.

The cylinder head 3 is centrally apertured and threaded to receive the threaded portion of an adjusting screw 16 having an externally disposed head 17 and lock nut 18. The inner unthreaded end 19 of said screw extends toward the spacer 10 for exerting a pressure thereon, said portion 19 bearing in a bore 20 in the head 3 and sealed therein by a pressure-actuated packing 21.

In order to uniformly distribute the pressure of screw 16 through the spacer 10 throughout the periphery of the liner flange 7, I provide a central socket 22 in the outer face of the hub 12 of the spacer for receiving and containing an anti-friction bearing 23, such as the roller bearing illustrated, as by means of one race 24 thereof. The inner terminal 25 of the portion 19 of screw 16 is of annular form corresponding in size to the outer bearing race 26 upon which said terminal bears. Hence, by tightening screw 16, the pressure thereof is distributed through the multiple rollers of the bearing 23 through the spacer hub 12, web portions 16 and rim 11, to the liner flange 7, thereby exerting uniform pressure throughout the circumference of the liner 4 to maintain the same in proper alignment.

Also, it will be noted, that the provision of the bearing 23 eliminates the friction of turning between screw 16 and spacer 10, making it much easier to move the screw for exerting a holding pressure upon the liner as stated.

Fig. 2 illustrates a modification wherein the spacer hub 12 is provided with a central spherical socket 27 receiving a spherical washer or bearing plate 28, said washer having a flat outer surface 29 against which the bearing 23 engages. By such a construction, I have further provided against any misalignment of spacer and screw, the spherical bearing for roller bearing 23 tending to centralize the pressure exerted by the screw through the spacer to the liner 4.

It will therefore be seen that I have provided a means for holding a pump liner by uniformly applied pressure, and have further provided for easy external adjustment of the applied pressure.

Various changes and modifications are contemplated within the scope of the following claims.

I claim:

1. Securing means for pump liners including a spacer having a central hub and a concentric annular portion spaced from the hub and embracing the liner, means for exerting a holding pressure on the spacer for securing the liner thereby, said means including a rotatable member movable toward and away from the spacer hub, and an anti-friction bearing disposed transversely between and in engagement with the hub and member for transmitting and annularly distributing the pressure of the latter to the spacer, the annular portion of the spacer engaging the liner being of greater diameter than said bearing.

2. Securing means for pump liners including a spacer having a central hub and a concentric annular portion spaced from the hub for embracing the liner, an annular concentric guiding portion on the spacer, means for exerting a holding pressure on the spacer for securing the liner thereby, said means including a rotatable screw centrally disposed with respect to the spacer engagement with the liner and movable in a direction to engage the hub, and an anti-friction bearing interposed between and in engagement with the hub and screw for transmitting and annularly distributing the pressure of the latter to the spacer, said bearing facilitating rotation of the screw while exerting pressure thereby upon the spacer.

3. Securing means for pump liners including a spacer having a central hub and a concentric annular portion spaced from the hub for embracing the liner, an annular concentric guiding portion on the spacer, means for exerting a holding pressure on the spacer for securing the liner thereby, said means including a rotatable screw centrally disposed with respect to the spacer engagement with the liner and movable in a direction to engage the hub, said hub having a spherical seat therein, a spherical washer engaging the seat, and an anti-friction bearing interposed between and in engagement with the washer and screw for transmitting and annularly distributing the pressure of the latter to the spacer, said bearing facilitating rotation of the screw while exerting pressure thereby upon the spacer.

4. In a pump having a fluid cylinder and a cylindrical liner therefor, said cylinder having an annular seat and said liner having an annular flange disposed therein, means for securing said liner in the cylinder by an applied longitudinal peripheral pressure upon the flange thereof, including a spacer having an annular rim embracing the liner flange and a concentric hub spaced longitudinally from the rim, said spacer also having an annular concentric guiding rim for engaging a portion of the cylinder wall, a cylinder head for closing the cylinder, a screw extending through said head on the longitudinal axis of the cylinder having an external head for rotation of the screw, the spacer hub having an anti-friction bearing mounted therein transversely of and having a race thereof in engagement with the inner end of the screw for transmitting and annularly distributing the pressure of the latter to the spacer, said bearing facilitating rotation of the screw while exerting pressure thereby upon the spacer.

JOHN M. SHIMER.